United States Patent [19]
Christner et al.

[11] Patent Number: 4,760,933
[45] Date of Patent: Aug. 2, 1988

[54] FUEL TANK TUBE VAPOR/FUEL SEAL

[76] Inventors: Susan A. Christner; Elaine R. Janda, both of 1235 S. Maple Rd., Apt. 301, Ann Arbor, Mich. 48103

[21] Appl. No.: 117,360

[22] Filed: Oct. 27, 1987

Related U.S. Application Data

[63] Continuation of Ser. No. 785,339, Oct. 7, 1985, abandoned.

[51] Int. Cl.⁴ ............................................. B67C 3/00
[52] U.S. Cl. ................................. 220/86 R; 141/350; 251/149
[58] Field of Search ..................... 141/348–362, 141/382–389, 325, 326, 327; 137/846; 220/85 F, 85 VR, 85 VS, 86 R; 251/149

[56] References Cited

U.S. PATENT DOCUMENTS

| | | | |
|---|---|---|---|
| 2,703,194 | 3/1955 | White | 141/96 |
| 3,495,594 | 2/1970 | Swanson | 604/99 |
| 3,566,928 | 3/1971 | Hansel | 141/97 |
| 3,734,149 | 5/1973 | Hansel | 141/350 |
| 3,903,942 | 9/1975 | Vest | 141/301 |
| 4,037,754 | 7/1977 | Wilhelmi et al. | 141/350 |

*Primary Examiner*—Mark J. Thronson
*Attorney, Agent, or Firm*—Basile and Hanlon

[57] ABSTRACT

A vapor/fuel seal for a fuel tank filler tube. The vapor/fuel seal includes an expansible seal member having inlet and outlet ends. The inlet end is sealingly mountable on the inlet end of the vehicle filler tube. The outlet end is normally closed and yet is expansible to receive the end of a dispensing fuel nozzle therethrough. Intermediate between the inlet and outlet ends of the seal member is an expansible fluid flow body portion which is expansible to receive and yet remain in sealing contact with the periphery of a fuel dispensing nozzle when the fuel nozzle is inserted therethrough.

3 Claims, 1 Drawing Sheet

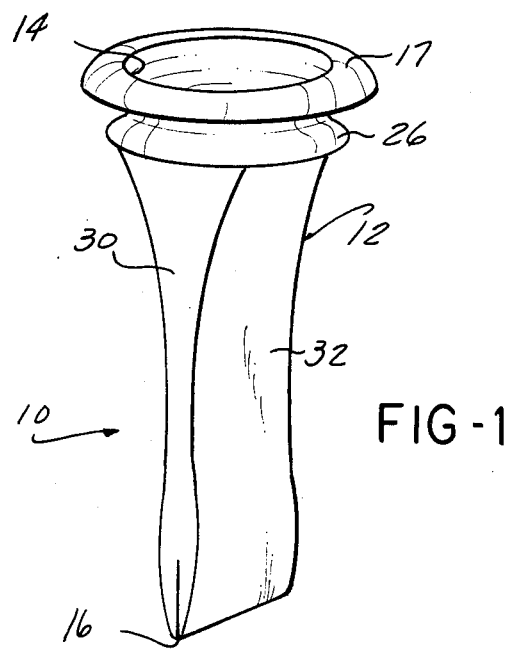
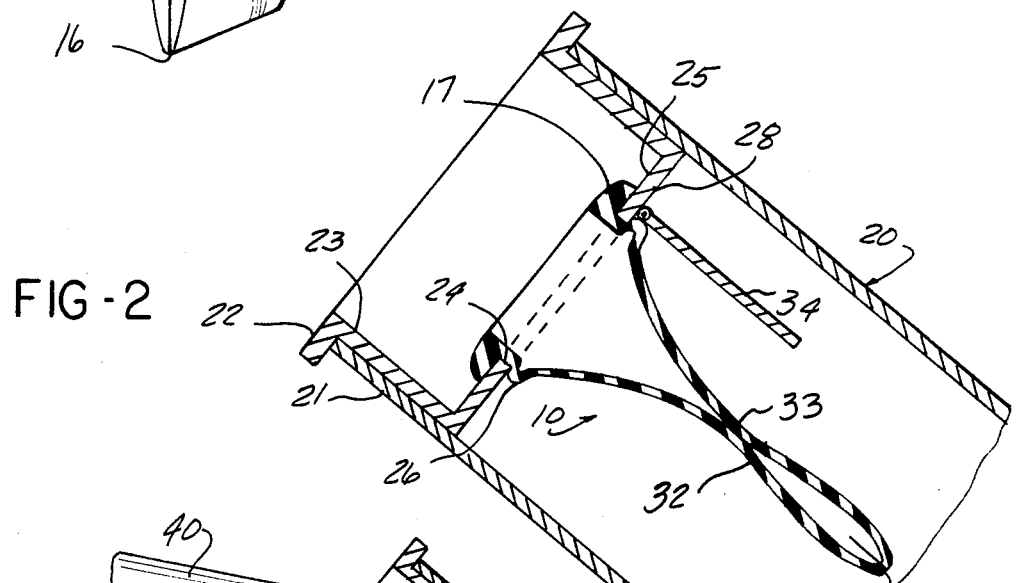
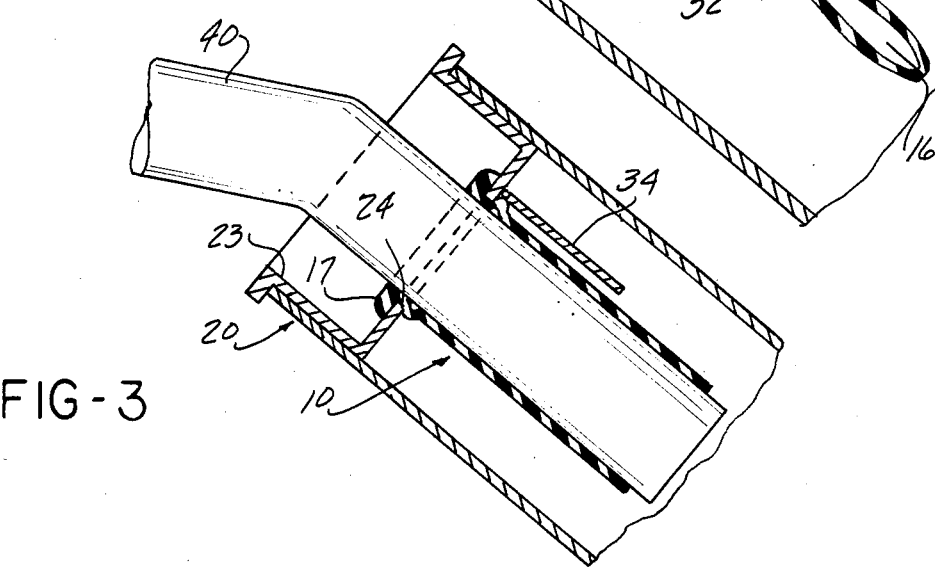

4,760,933

FUEL TANK TUBE VAPOR/FUEL SEAL

This application is a continuation of application Ser. No. 785,339, filed 10/7/85, now abandoned.

BACKGROUND OF THE INVENTION

1. Field of the Invention

This invention relates, in general, to motor vehicle fuel systems and, more specifically, to vapor and/or fuel seals for motor vehicle fuel systems.

2. Description of the Prior Art

In order to operate motor vehicles, such as automobiles, boats, airplanes, trucks, etc., fuel, such as gasoline, diesel, kerosene, etc., is required to operate the engines of such devices. Typically, the fuel is introduced into a tank within such vehicles from a supply reservoir through a dispensing nozzle. The fuel is introduced into the vehicle fuel tank in a liquid state but produces vapors at ambient temperatures and may also overflow through the filler tube if the tank is overfilled.

It is known that the vapors introduced into the atmosphere during the transfer of such fuels from the storage tank to the tank within such vehicles contributes to pollution of the atmosphere and, also, may cause harmful effects to the person dispensing the fuel through inhalation of the fuel vapors. In addition, combustible fuels are highly inflammable and may be easily ignited if brought into contact with a flame or hot surface.

Efforts have been made to prevent the discharge of such vapors or fuel into the atmosphere by providing a seal between the dispensing nozzle from the storage tank and the filler tube in the vehicle. Typically, such sealing means are in the form of a flexible cap attached to the dispensing nozzle which covers the end of the filler tube on the vehicle. While reducing the amount of vapors introduced into the atmosphere during the fuel transfer process, such previously devised sealing methods have not provided complete sealing of the filler tube such that significant amounts of fuel vapors still escape into the atmosphere. Furthermore, such sealing means do not prevent the escape of liquid fuel from the filler tube if the tank is inadvertantly overfilled or filled at too fast a rate.

It is also known to provide vapor seals for such fluid transfer processes as disclosed in U.S. Pat. No. 3,903,942. In this device, an adaptor is mounted within the filler tube on the vehicle which expands to sealingly receive the discharge end of the dispensing nozzle thereby preventing the escape of vapors from the vehicle tank during the fuel transfer process. However, this adaptor is provided with open inlet and outlet ends such that when the adaptor is not being used for the injection of fuel into the tank, the passage between the inlet and outlets is open thereby allowing the escape of vapors from the vehicle tank to the atmosphere when the filler tube cap is removed.

Thus, it would be desirable to provide a vapor/fuel seal for a vehicle fuel tank filler tube which completely seals the inlet to the filler tube during use of the vehicle and, provides a seal when a dispensing nozzle from a storage tank is introduced into the filler tube to add additional quantities of fuel into the vehicle fuel tank. It would also be desirable to provide a vapor/fuel seal for a fuel tank filler tube which may be easily installed on new and existing vehicles to provide the desired vapor and fuel sealing features described above.

SUMMARY OF THE INVENTION

The present invention is a vapor/fuel seal for a vehicle fuel tank filler tube in the form of an expandable seal member which is mountable on the inlet end of the vehicle filler tube. The vapor/fuel seal is formed of a flexible expandable material having inlet and outlet ends. The inlet end is sealingly mountable over the inlet of the vehicle filler tube. The outlet end of the seal member in a normal state is sealingly closed thereby preventing the escape of fuel vapors and/or liquid fuel outward through the filler tube.

However, the seal member is expandable upon the introduction of the dispensing nozzle therethrough to sealingly surround the peripheral surfaces of the dispensing nozzle to again prevent the escape of fuel vapors and/or liquid fuel during a fuel transfer process.

The vapor/fuel seal of the present invention is easily installed upon new or existing vehicle fuel tank filler tubes to prevent the escape of fuel vapors and/or liquid fuel during operation of the vehicle or when the vehicle is being refueled.

BRIEF DESCRIPTION OF THE DRAWING

The various features, advantages and other uses of the present invention will become more apparent by referring to the following detailed description and drawing in which:

FIG. 1 is a perspective view of the vapor seal of the present invention;

FIG. 2 is a cross-sectional view showing the installation of the vapor seal of the present invention in a conventional vehicle filler tube; and FIG. 3 is an enlarged cross-sectional view showing the insertion of a nozzle into the vapor seal of the present invention mounted within the filler tube of a motor vehicle.

DESCRIPTION OF THE PREFERRED EMBODIMENT

Throughout the following description and drawing, an identical reference number is used to refer to the same component shown in multiple figures of the drawing.

As shown in the drawing, and in particular in FIG. 1, there is illustrated a vapor/fuel seal 10 which prevents the escape of vapors and/or liquid fuel from the fuel tank of a motor operated vehicle, such as an automobile, truck, boat, airplane, etc., during use of the vehicle as well as during the transfer of fuel from a storage tank to the vehicle fuel tank.

The seal member 10 is in the form of an elongate body 12 having inlet and outlet ends 14 and 16, respectively. The inlet end 14 is formed with a first annular ring 17 which is adapted to fit over and mount the seal member 10 on the exterior of the inlet end of a conventional vehicle filler tube or neck 20, shown detail in FIG. 2. The filler tube 20 includes a tube 21 having an interior cap member 22 mounted at the inlet therein which includes a centrally located aperture 24 for receiving the dispensing nozzle of a fuel transfer system as described in greater detail hereafter. The aperture 24 is normally closed by a spring biased cover 34 which moves to an open position, clearing the aperture 24, when the seal member 10 is mounted on the filler tube 20.

The seal member 10 also includes a second outwardly extending annular rib 26 spaced from the first annular rib 17 which secures and mounts the seal member 10 within the interior surface of the cap 22 of the vehicle filler tube.

The body 12 has an elongated shape extending from the second rib 26 to the outlet 16 in a tapered form. Opposed side edges, one of which is shown in FIG. 1 and denoted in general by reference number 30, are formed on opposite sides of the elongated portion of the seal member 10. Expandable side portions 32 extend between the side edges 30 to enable the seal member 10 to expand to receive and sealingly secure a fuel discharging nozzle therein.

The side portions 32 of the seal member 10 have a generally inwardly tapering form between the inlet 14 and the outlet end 16, as shown in FIG. 1, with the seal member 10 depicted in its normally collapsed position. In this position, the inlet end 14 is open; while the outlet end 16 is normally closed at an intermediate point 33 thereby preventing the escape of vapors and/or liquid fuel from the vehicle fuel tank, not shown, through the seal member 10 and filler tube.

A plurality of apertures, not shown, may be formed on the side edges 30 and side portions 32 adjacent the second rib 26 to allow partial venting of fuel vapors during normal operation of the vehicle.

The seal member 10 is formed of any suitable material which is impervious to the corrosive effects of gasoline or diesel fuel as well as providing long term use on a vehicle. Such materials could include rubber and suitable plastics, such as polypropylene, PVC, etc., which would provide the desired degree of expansibility to allow the introduction of the dispensing nozzle therethrough as well as providing a complete seal when the nozzle is removed from the seal member 10.

As shown in FIG. 2, the seal member 10 is mounted within the filler tube 20 of a motor vehicle which includes an interior cap member 22 having a recessed cavity 23 formed therein and bottom plate 25 mounted at a lower extremity. The central aperture 24 formed within the bottom plate 25 of the member 22 receives the discharge nozzle of a conventional fuel transfer system, such as those typically employed in gasoline service stations.

The upper or first rib 14 of the top surface of the seal member 10 has a diameter sufficient to be sealingly mounted above the aperture 24 in the bottom 25 of the plate member 22. The second, spaced, annular member or rib 26 is adapted to be mounted, after the seal member 10 is inserted through the aperture 24, on the bottom surface of the plate member 25. The first and second ribs 14 and 26 sealingly mount the seal member 10 on the plate 25 of the filler tube 20. The tapering sides 30 and 32 of the seal member 10 extend inward from the second annular member 26 into the interior of the filler tube 20 to the closed outlet 16 as shown in FIG. 2. This prevents the escape of fuel vapors and/or liquid fuel within the vehicle fuel tank, not shown, from escaping through the filler tube 20 to the ambient atmosphere.

When a discharge nozzle 40, as shown in FIG. 3, is introduced into the filler tube 20 to allow the input of additional quantities of fuel into the vehicle fuel tank, the outer end of the discharge nozzle 40 is forced through the expansible body portion 32 of the seal member 10 during which time the sidewalls 30 and 32 of the seal member 10 expand outward and yet provide a complete sealing contact with the exterior periphery of the discharge nozzle 40, as shown in FIG. 3. This maintains a constant vapor and/or liquid seal between the vehicle fuel tank, the filler tube 20 and the ambient atmosphere which prevents the escape of fuel vapors and/or liquid fuel from the vehicle fuel tank.

In summary, there has been disclosed a unique vapor/fuel seal for a vehicle fuel tank which provides a seal which prevents the escape of vapors and/or liquid fuel from the vehicle fuel tank during the use of the vehicle, as well as during the refueling process when a discharge or dispensing nozzle from an exterior fuel source is introduced into the filler tube of the vehicle to add additional quantities of fuel to the vehicle fuel tank. The vapor/fuel seal of the present invention is of economical construction and may be added to new as well as existing fuel tanks.

What is claimed is:

1. A vapor/fuel seal for a fuel tank filler tube having inlet and outlet ends comprising:

an elongated seal member defining an expansible fluid flow passage having opposing tapered side edges, opposing expansible side portions integrally formed with said side edges, the tapered side edges being angularly oriented with respect to the expansible side portions, the elongated seal member further having an inlet and an outlet;

a pair of spaced annular rib means formed adjacent to the inlet of the seal member, for sealingly attaching the inlet of the seal member to the inlet end of the fuel tank filler tube;

a first normally closed seal region formed by said opposing tapered side edges and said opposing expansible side portions, said first seal region being disposed intermediately in the fluid flow passage between the inlet and outlet of the seal member capable of sealingly closing off the fluid flow passage;

a second normally closed seal region formed by said opposing tapered side edges and said opposing expansible side portions, said second seal region being disposed adjacent the outlet of the seal member for sealingly closing off the fluid flow passage, wherein the expansible fluid flow passage allows insertion of a fuel dispensing nozzle through the inlet of the seal member to successively open said first and second seal regions while successive portions of said opposing tapered side edges and said opposing expansible side portions sealingly engage with said fuel dispensing nozzle, an operable chamber being defined in said elongated seal member, said chamber being defined by said first normally closed seal region, said second normally closed seal region, said opposing expansible side portions and said opposing tapering side edges, said chamber being operable with the insertion of the fuel dispensing nozzle.

2. The vapor/fuel seal of claim 1 wherein the seal member is formed of an expandable material selected from the group consisting of plastic or rubber.

3. In a vapor/fuel seal for a fuel tank filler tube including an inlet end, an outlet end, and an interior cap member insertably connected to said inlet end of said fuel tank filler tube, said interior cap member having a bottom plate with a centrally located aperture, and a spring biased cover for closing said centrally located aperture, defining a recessed cavity in said fuel tank filler tube adjacent said inlet end, the improvement to said vapor/fuel seal comprising:

an elongated vapor/fuel seal member having an inlet and an outlet;

a first outwardly extending annular rib adjacent the inlet of said seal member for sealingly attaching the seal member on one side of said bottom plate through said centrally located aperture;

a second outwardly extending annular rib adjacent said inlet of said seal member for sealingly attaching the seal member on another side of said bottom plate through said centrally located aperture;

opposing tapered side edges of said seal member disposed between said second annular rib and said outlet of said seal member, said opposing tapered side edges having a first tapered portion at an intermediate point between said second rib and said outlet of said seal member, and a second tapered portion disposed at said outlet of said seal member; and opposing expansible side portions integrally formed with said opposing tapered side edges of said seal member to define a fluid flow passage between said inlet and said outlet of said seal member, wherein said expansible fluid flow passage normally collapses at said first and said second tapered portions to seal said opposing expansible side portions at a said intermediate point and at said outlet of said seal member, while allowing insertion of a fuel dispensing nozzle through said inlet of said seal member to successively open said first and second tapered portions as said opposing tapered side edges and said opposing expansible side portions sealingly engage with said fuel dispensing nozzle.

* * * * *